United States Patent [19]

Gaudino

[11] Patent Number: 4,886,636
[45] Date of Patent: Dec. 12, 1989

[54] METHOD OF CONTROLLING THE PORE MORPHOLOGY OF STRENGTHENED SILVER POWDER COMPACTS

[75] Inventor: Larry J. Gaudino, Greensboro, N.C.

[73] Assignee: Technitrol, Inc., McKeesport, Pa.

[21] Appl. No.: 204,660

[22] Filed: Jun. 13, 1988

[51] Int. Cl.$^4$ .............................................. G22F 1/00
[52] U.S. Cl. ........................................ 419/2; 75/232; 75/246; 419/21; 419/31
[58] Field of Search ................. 419/31, 21, 2; 75/232, 75/246

[56] References Cited

U.S. PATENT DOCUMENTS

| | | | |
|---|---|---|---|
| 4,568,384 | 2/1986 | Maher | 75/0.5 R |
| 4,792,505 | 12/1988 | Moyer | 429/219 |
| 4,808,223 | 2/1989 | Ozaki et al. | 75/235 |

Primary Examiner—Stephen J. Lechert, Jr.
Assistant Examiner—Ngoclain Wai
Attorney, Agent, or Firm—Armstrong, Nikaido Marmelstein, Kubovcik & Murray

[57] ABSTRACT

In the manufacture of a porous silver structure made by pressing and sintering silver powder prepared by ion substitution process, porosity of the structure is increased by heat treating the silver prior to pressing and sintering.

6 Claims, No Drawings

METHOD OF CONTROLLING THE PORE MORPHOLOGY OF STRENGTHENED SILVER POWDER COMPACTS

This invention concerns a method of providing a rigid network structure of controlled porosity in pressed and sintered silver powder compacts without the use of plasticizing or pore forming agents, such as methylcellulose, sodium carboxymethylcellulose, ground charcoal or wood flour. Such a rigid porous network structure is widely used as a cathode plate in silver based electrochemical systems.

Cathode plates are normally fabricated by either mold pressing of continuous rolling pure silver powder which is then sintered. The sintered plates are then subjected to anodic oxidation to convert the silver to a mixture of monovalent ($Ag_2O$) and divalent ($AgO$) silver oxide. Porosity is important in order to permit penetration of electrolyte solution into the plate.

Pure silver powder is prepared by a galvanic or ion substitution process such as is disclosed in U.S. Pat. No. 3,874,940. Silver chloride is precipitated from a silver nitrate solution by means of chloride ions, supplied by either HCl or NaCl. The precipitated silver chloride is reduced to pure silver by addition of a less electronegative metal such as copper, iron or zinc in a weak acidic aqueous solution. Silver powder produced by the ion substitution method forms, for example, 100 micron diameter agglomerates of partially fused fine subagglomerate particles having an average size diameter of less than one micron.

Our analysis of porous network structures shows that two basic pore configurations exist within the structure: (1) the larger pores, formed by interconnected bonding of the aggregates, are referred to as channel or macro porosities; (2) the smaller pores within the aggregates are referred to as the internal or micro porosities. The micro porosities provide a high percentage of the total open silver surface area.

When the pure silver powder referred to above was pressed at 20 tons per square inch (TSI) and then sintered at 900° C. for 30 minutes in air, the pressed and sintered compact underwent 24% linear shrinkage. The actual total accessible pore volume of this compact measured only 6%. The limited amount of open porosity in this silver powder morphology resulted in poor silver oxide conversion, upon anodic oxidation, and no meaningful electrochemical measurement could be made.

In accordance with this invention, the silver powder, prior to pressing and sintering, is heat treated at about 300° to 700° C. to increase the mean subagglomerate particle size with little change in the agglomerate size. In one example, the silver powder was loosely flowed into a stainless steel pan and heated in air at 400° C. for 30 minutes. This partially sintered silver cake was broken down and lightly blended in a twin cone type blender for ten minutes before classifying to less than 100 mesh. The mean subagglomerate particle size increased to 4.6 microns (from one micron) and the agglomerate size decreased to 93 microns (from 100 microns). This powder, when pressed at 20 TSI and sintered at 900° C. for 30 minutes in air, had only 18% linear shrinkage but yielded 26% accessible porosity. Of this porosity, 24% was micro pore volume, 70% was macro pore volume and the balance of pores were too small to measure. Average micro pore diameter was 41 microns and average macro pore diameter was 750 microns. Upon anodic oxidation, electrochemical potential analysis showed 84.3% of the silver converted to the divalent oxide, 15.5% to the monovalent oxide, with less than 0.2% of the silver not converted.

Heat treating at about 400° C. yields optimum results for AgO conversion. For example, heat treating at 500° C. yielded 6 micron subagglomerate particle size but only about 19% accessible porosity. Average micro pore diameter was 49 microns and average macro pore diameter was 1022 microns. Only 63.4% of the silver was converted to the divalent oxide, which is the desirable oxide; 36.2% was converted to the monovalent oxide and 0.4% was not converted.

Heat treating at 600° C. yielded 8.5 micron subagglomerate particle size and only about 12½% accessible porosity. Average micro pore diameter was 57 microns and average macro pore diameter was 2036 microns. 45% of the silver was converted to the divalent oxide, 54.6% to the monovalent oxide, and 0.4% was not converted.

I claim:

1. In the manufacture of a rigid porous network structure made by pressing and sintering silver prepared by the ion substitution process, the improvement which comprises heat treating the silver prior to pressing and sintering in order to increase the porosity of the structure.

2. The process of claim 1 wherein the heat treating step is performed at about 300° to 700° C.

3. The process of claim 1 wherein the silver prepared by the ion substitution process consists of agglomerates of partially fused subagglomerate particles and wherein the heat treating step increases the size of the subagglomerate particles without significant change in the size of the agglomerates.

4. In the manufacture of an electrode for an electrochemical cell made by pressing and sintering silver prepared by the ion substitution process the improvement which comprises heat treating the silver prior to pressing and sintering in order to increase the porosity of the electrode.

5. The process of claim 4 comprising the additional step of anodic oxidation of the pressed and sintered silver in order to convert the silver to silver oxide.

6. The process of claim 5 wherein the silver is converted to both monovalent silver oxide and divalent silver oxide and wherein the heat treating step is performed at about 400° C. in order that the silver, upon anodic oxidation, be preferentially converted to divalent silver oxide.

* * * * *